United States Patent [19]

Ito et al.

[11] Patent Number: 4,822,848
[45] Date of Patent: Apr. 18, 1989

[54] HYDROPHILIC-HYDROPHOBIC THERMALLY REVERSIBLE TYPE POLYMER AND METHOD FOR PRODUCTION THEREOF

[75] Inventors: Shoji Ito; Kensaku Mizoguchi, both of Ibaraki; Yoshio Suda, Hachioji, all of Japan

[73] Assignees: Agency of Industrial Science & Technology; Ministry of International Trade & Industry, both of Tokyo, Japan

[21] Appl. No.: 144,649

[22] Filed: Jan. 11, 1988

Related U.S. Application Data

[62] Division of Ser. No. 943,703, Dec. 19, 1986, abandoned.

[30] Foreign Application Priority Data

Dec. 23, 1985 [JP] Japan .................................. 60-290100

[51] Int. Cl.⁴ ........................ C08L 41/00; C08L 43/00
[52] U.S. Cl. .................................... 524/549; 524/811; 526/270; 526/304
[58] Field of Search ................ 524/549, 811; 526/270, 526/304

[56] References Cited

U.S. PATENT DOCUMENTS 4,497,929 2/1985 Brown et al. ........................ 526/270
4,608,424 8/1986 Brown et al. ........................ 526/270

Primary Examiner—Harold D. Anderson
Attorney, Agent, or Firm—Oblon, Fisher, Spivak, McCelland & Maier

[57] ABSTRACT

A novel polymer having repeating units of the formula:

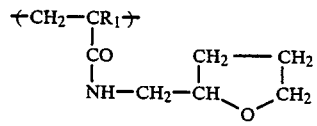

(wherein $R_1$ stands for a hydrogen atom or a methyl group) is produced by polymerizing N-tetrahydrofurfuryl acrylamide or N-tetrahydrofurfuryl methacrylamide. This is a hydrophilic-hydrophobic thermally reversible type polymer.

5 Claims, 4 Drawing Sheets

FIG_1
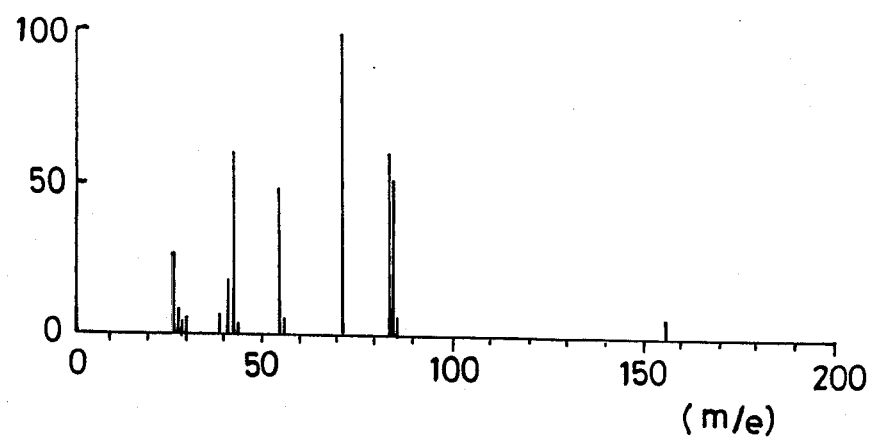
FIG_2
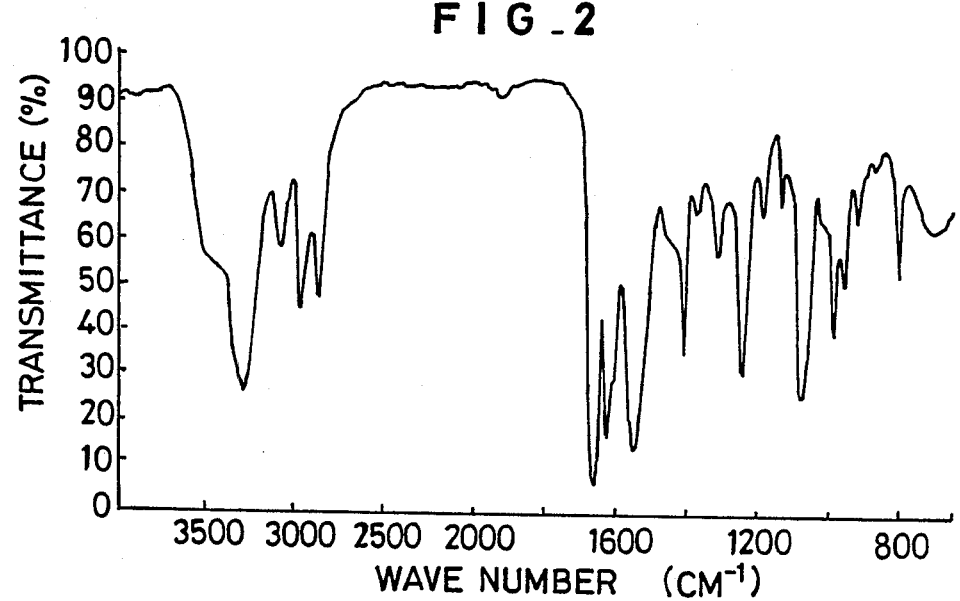

FIG_3
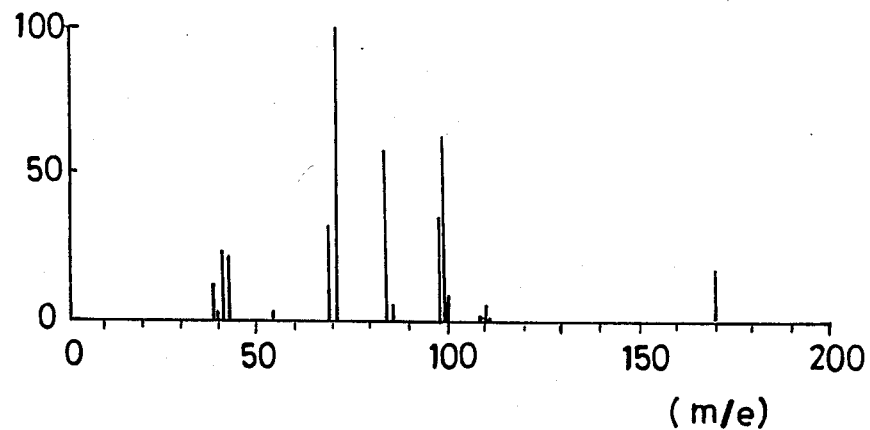
FIG_4
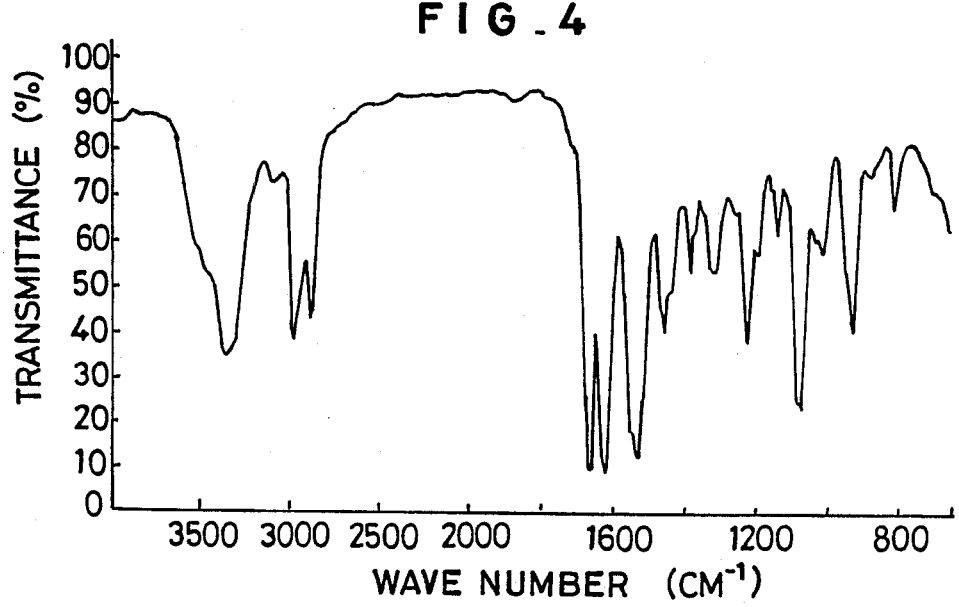

HYDROPHILIC-HYDROPHOBIC THERMALLY REVERSIBLE TYPE POLYMER AND METHOD FOR PRODUCTION THEREOF

This application is a Division of application Ser. No. 943,703, filed on Dec. 19, 1986, now abandoned.

FIELD OF THE INVENTION AND RELATED ART STATEMENT

This invention relates to a novel hydophilic-hydrophobic thermally reversible type polymer and a method for the production thereof. More specifically, this invention relates to a hyrophilic-hydrophobic thermally reversible type polymer useful as a material for light shields, temperature sensors, adsorbents, toys, interior decorations, printing agents, displays, release membranes, and mechanochemical devices and a method for producing the polymer with high efficiency.

Some of the water-soluble macromolecular compounds exhibit a peculiar behavior of reversible solubility such that, in an aqueous solution, opacification of the solution with a precipitate occurs at temperatures above a certain level (transition point or clouding point) and clarification of the solution due to resolving of the precipitate occurs at temperatures below the transition point. Such compounds are called "hydrophilic-hydrophobic thermally reversible type polymers" and have been finding growing utility as shades in hothouses, chemical laboratories, radioisotope tracer laboratories, as temperature sensors, and as adsorbents for water-soluble organic substances.

As such thermally reversible macromolecular compounds, partially saponified polyvinyl acetate (Kagaku to Kogyo, Vol. 27, p. 84, 1974), polyvinyl methyl ether (J. of Colloid and Interface Sci., Vol. 35, p. 77, 1971), methyl cellulose (J. of Appl. Polym. Sci., Vol. 24, p. 1073, 1979), polyethylene oxide (J. of Appl. Polym. Sci., Vol. 1, p. 56, 1959), polyvinyl methyloxazolideinone (Fed. Proc. Suppl., Vol. 15, p. S-24, 1964), and polyacrylamide derivatives (Report of Research Institute for Polymers and Textiles, No. 144, p. 7, 1984) have been known to the art.

Among the thermally reversible type polymers, polyacrylamide derivatives are highly suitable for the applications mentioned above because they are stable in water and can be produced rather inexpensively. To date, poly(N-propylacrylamide), poly(N,N-diethylacrylamide), poly(N-acrylpyrrolidine), poly(N-acrylpiperidine), etc. are about the only thermally reversible polyacrylamide derivatives known to the art.

When they are to be applied as temperature sensors or light shields, for example, their usefulness is limited because their transistion points are directed by in particular the substances and cannot be set at will.

OBJECT AND SUMMARY OF THE INVENTION

This invention is directed to widening the range of applications in which hydrophilic-hydrophobic thermally reversible type polyacrylamide derivatives find utility. An object of this invention, therefore, is to provide a novel polyacrylamide hydrophilic-hydrophobic thermally reversible type polymer possessing a transition point different from the transition point heretofore known to the art and a method for efficient production of the polymer.

The inventors conducted a diligent study in search of such polymers. As a result, they have found that polymers obtained by radical polymerization of vinyl compounds represented by the general formula (I):

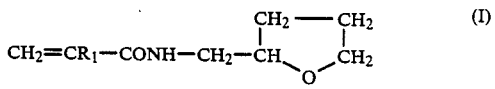

(wherein $R_1$ stands for a hydrogen atom or a methyl group) are capable of hydrophilic-hydrophobic thermal reversion. This invention has been perfected based on this finding.

To be specific, this invention provides a hydrophilic-hydrophobic thermally reversible type polymer having repeating units of the following formula (II):

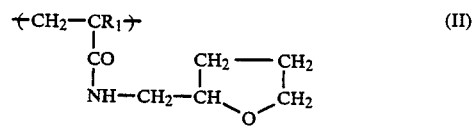

(wherein $R_1$ has the same meaning as defined above) and exhibiting an intrinsic viscosity in the range of 0.01 to 6.0 as measured in methanol solution at 30° C. and a method for the production of the hydrophilic-hydrophobic thermally reversible type polymer by the radical polymerization of a vinyl compound represented by the aforementioned general formula (I).

The above and other objects and features of the invention will become more apparent from the following detailed description with reference to the accompanying drawings.

BRIEF DESCRIPTION OF THE DRAWINGS

FIG. 1 is a mass spectrum of N-tetrahydrofurfuryl acrylamide.

FIG. 2 is an IR spectrum of N-tetrahydrofurfuryl acrylamide.

FIG. 3 is a mass spectrum of N-tetrahydrofurfuryl methacrylamide.

FIG. 4 is an IR spectrum of N-tetrahydrofurfuryl methacrylamide.

DETAILED DESCRIPTION OF THE PREFERRED EMBODIMENT

Figure 5:
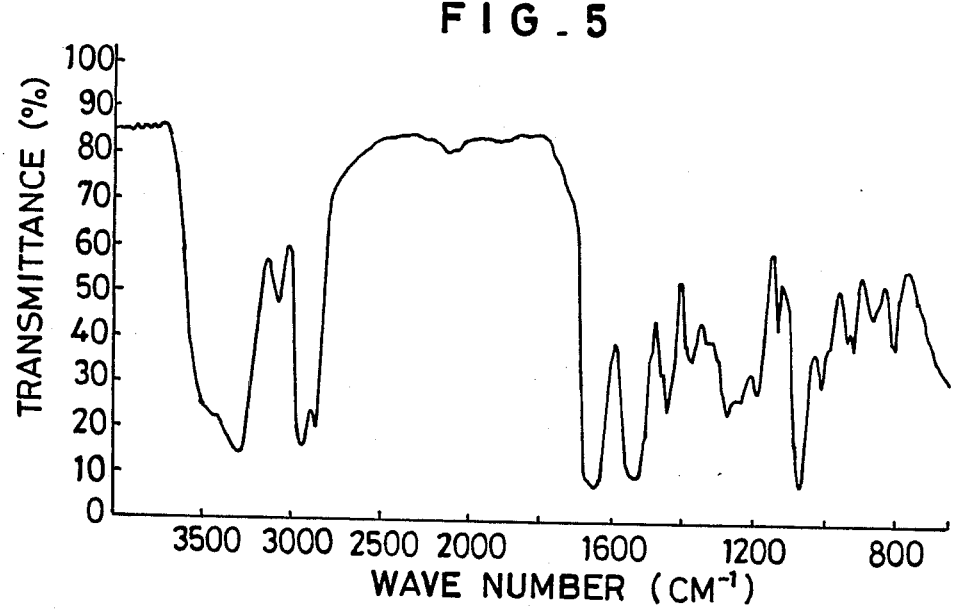
FIG. 5 is an IR spectrum of poly(N-tetrahydrofurfuryl acrylamide) of the present invention.

The vinyl compound of the aforementioned general formula (I) of the present invention can be prepared as shown by the following formula by causing acrylic chloride or methacrylic chloride to react with tetrahydrofurfurylamine and triethylamine in benzene preferably at a temperature in the range of 0° to 10° C.

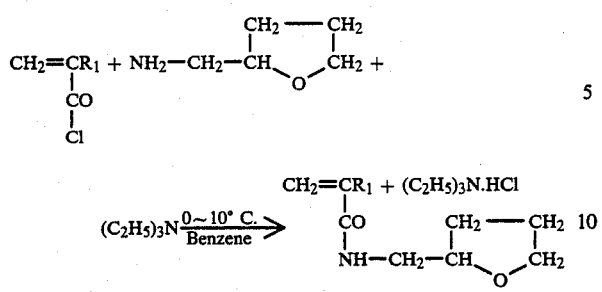

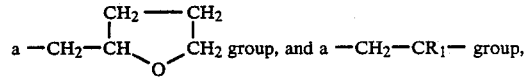

(wherein $R_1$ has the same meaning as defined above.)

To be concrete, the vinyl compounds represented by the general formula (I) are N-tetrahydrofurfuryl acrylamide (boiling point 115° C./1 mmHg) and N-tetrahydrofurfuryl methacrylamide (boiling point 140° C./4 mmHg).

In this invention, one or the other of these vinyl compounds is radically polymerized to produce a polymer. As the means for effecting this polymerization, the solution polymerization method and the bulk polymerization method can be used. Generally, the solution polymerization method is advantageous. In this solution polymerization method, any known technique of radical polymerization can be adopted which comprises dissolving the vinyl compound in a solvent thereby producing a solution containing the vinyl compound at a concentration in the range of 1 to 80% by weight and exposing the solution to a radiation, heating the solution in the presence of a radical polymerization initiator, or exposing the solution to light in the presence of an optical sensitizer. The solvent to be used in this solution polymerization method is not specifically limited. Examples of solvents advantageously usable for the method include water, alcohols, N,N-dimethyl formamide, N,N-dimethyl acetamide, dimethyl sulfoxide, acetone, dioxane, tetrahydrofuran, benzene, chloroform, and carbon tetrachloride. One member or a combination of a plurality of members selected from the group mentioned above can be used.

The hydrophilic-hydrophobic thermally reversible type polymer of this invention obtained as described above possesses intrinsic viscosity [$\eta$], in the range of 0.01 to 6.0 as measured in methanol solution at 30° C. The degree of polymerization of the polymer which corresponds to the limited viscosity number falling in the aforementioned range is controlled as follows. In the case of the solution polymerization, the degree of polymerization is generally high when the concentration of the initiator is low, the reaction temperature is low, and the chain transfer constant of the solvent is small. Further, the degree of polymerization is high when the monomer is soluble in the solvent and the polymer is insoluble therein.

The polymer of the present invention which is obtained as described above possesses high-temperature hydrophobic type thermal reversibility, i.e. a behavior such that the polymer dissolves in water at low temperatures and becomes insoluble at high temperatures. Although the transition point of this polymer is variable with the conditions of polymerization, poly(N-tetrahydrofurfuryl acrylamide) exhibits a transition point in the range of 27° to 30° C. and poly(N-tetrahydrofurfuryl methacrylamide) in the range of 32° to 37° C. as measured in 1% aqueous solution, on the condition that both the polymers possess an intrinsic viscosity [$\eta$] in the range of 0.01 to 6.0 as measured in a methanol solution at 30° C.

Since the polymer of this invention possesses a —CONH— group, a —CH$_2$—CH$\begin{smallmatrix}CH_2 &\!\!\!-\!\!\!-\!\!\!- &CH_2\\ | & & |\\ & O &\end{smallmatrix}$CH$_2$ group, and a —CH$_2$—CR$_1$— group, it can be identified by infrared absorption spectrum, for example. As concerns the solubility of the polymer, the polymer is soluble in cold water, methanol, ethanol, chloroform, acetone, tetrahydrofuran, and N,N-dimethyl formamide, for example, and insoluble in hot water, n-hexane, n-heptane, ethyl acetate, n-propyl acetate, isopropyl acetate, n-butyl acetate, sec-butyl acetate, iso-butyl acetate, tert-butyl acetate, n-amyl acetate, n-hexyl acetate, etc.

The transition point of the aqueous solution of the polymer of this invention can be varied by addition of an electrolyte or a water-soluble organic substance as follows. Although the effect which the electrolyte has on the transition point of the aqueous solution of the polymer of this invention differs with the particular kind of the electrolyte, the transition point generally tends to fall in proportion as the concentration of the electrolyte increases. The effect of the water-soluble organic substance upon the transition point differs with the kind of the organic substance. Generally, however, the transition point is increased by the addition of the organic substance. For example, addition of methanol or ethanol brings about an increase in the transition point.

It will now be shown how the transition point of a 1% aqueous solution of the polymer according to this invention is changed by various additives. The data in the table below are for the cases where the intrinsic viscosity [$\eta$] of the polymer is a methanol solution at 30° C. was 0.83 for poly(N-tetrahydrofurfuryl acrylamide) and 0.20 for poly(tetrahydrofurfuryl methacrylamide).

| Additive | Poly(N—tetrahydrofurfuryl acrylamide) | Poly(N—tetrahydrofurfuryl methacrylamide |
| --- | --- | --- |
| NaCl, 1 mol/lit. | 17.5° C. | 17.7° C. |
| NaCl, 2 mols/lit. | 11.0° C. | 11.5° C. |
| Methanol, 15 vol. % | 33.0° C. | 34.5° C. |
| Methanol, 30 vol. % | 57.0° C. | 65.5° C. |

The polyacrylamide hydrophilic-hydrophobic thermally reversible type polymer of the present invention exhibits a high temperature thermal reversibility, i.e. a property such that it dissolves in water at low temperatures and becomes insoluble at high temperatures. It possesses a transition point different from the transition points of the conventional thermally reversible type polyacrylamide derivative and can be used as a material for shades in hothouses, chemical laboratories, and radioisotope tracer laboratories, for temperature sensors, adsorbents of water-soluble organic substances, and for toys, interior decorations, printing agents, displays, release films, and mechanochemical devices.

When the polymer of this invention is applied in the unmodified form of an aqueous solution or in a form prepared as a water-containing gel or microcapsules on a transparent plate, the coating consequently obtained is suitable as a shade for automatically preventing the temperature of a room interior from being raised higher than is desired by direct sunlight.

Now, the present invention will be described more specifically below with reference to working examples.

Referential Example—Production of vinyl compound represented by Formula I:

In an Erlenmeyer flask having an inner volume of 1 liter, 51.33 g of triethylamine, 51.13 g of tetrahydrofurfuryl amine, and 450 ml of benzene were kept cooled below 10° C. and stirred. While this liquid mixture was being stirred, a mixture of 41.5 ml of acrylic chloride with 50 ml of benzene was slowly added thereto dropwise from a dropping funnel over a period of 3 hours. After completion of the dropwise addition, the reaction solution was left to cool overnight and then filtered. The filtrate was concentrated by removal of benzene with a rotary evaporator. Then, the concentrate was distilled under a vacuum to recover a transparent colorless distillate having a boiling point of 115° C./1 mmHg. Consequently, there was obtained 55.0 g of a liquid substance.

Based on the mass spectrum shown in FIG. 1 and the IR spectrum shown in FIG. 2, this substance was identified to be N-tetrahydrofurfuryl acrylamide.

A liquid substance having a boiling point of 140° C./4 mmHg was recovered by faithfully repeating the procedure described above, excepting methacrylic chloride was used in the place of acrylic chloride. Consequently, there was obtained 55.0 g of a liquid substance. Similarly based on the mass spectrum shown in FIG. 3 and the IR spectrum shown in FIG. 4, this substance was identified to be N-tetrahydrofurfuryl methacrylamide.

EXAMPLE OF THE INVENTION

A hydrophilic-hydrophobic thermally reversible type polymer of the present invention was produced by polymerizing the monomer obtained in the Referential Example by the method of the present invention.

As a polymerization initiator, azobisisobutyronitrile was used. N-tetrahydrofurfuryl acrylamide and N-tetrahydrofurfuryl methacrylamide were each added to a benzene solution having a polymerization initiator content of 50 mg/ml, placed in an ampoule, removed of gas under a vacuum with liquefied nitrogen, sealed, and left reacting at 50° C. for 2 hours in the case of the former monomer and for 24 hours in the case of the latter monomer. After the reaction, the resulting solution was poured into a mixed solvent of benzene-n-hexane to cause precipitation of the polymer which was subsequently recovered.

The polymers thus obtained were each prepared as a methanol solution and tested for intrinsic viscosity [$\eta$] with an Ubbelohde's viscometer at 30° C. Based on the infrared absorption spectra shown in FIG. 5 and FIG. 6, the polymers were identified to be hydrophilic-hydrophobic thermally reversible type polymers of this invention having the repeating unit represented by the general formula (II).

In the spectrum of FIG. 5, the absorption of a vinyl group appearing at 1622 cm$^{-1}$ in the spectrum of FIG. 2 is absent. This indicates that the polymer giving the spectrum of FIG. 5 was a polymer of N-tetrahydrofurfuryl acrylamide.

Figure 6:
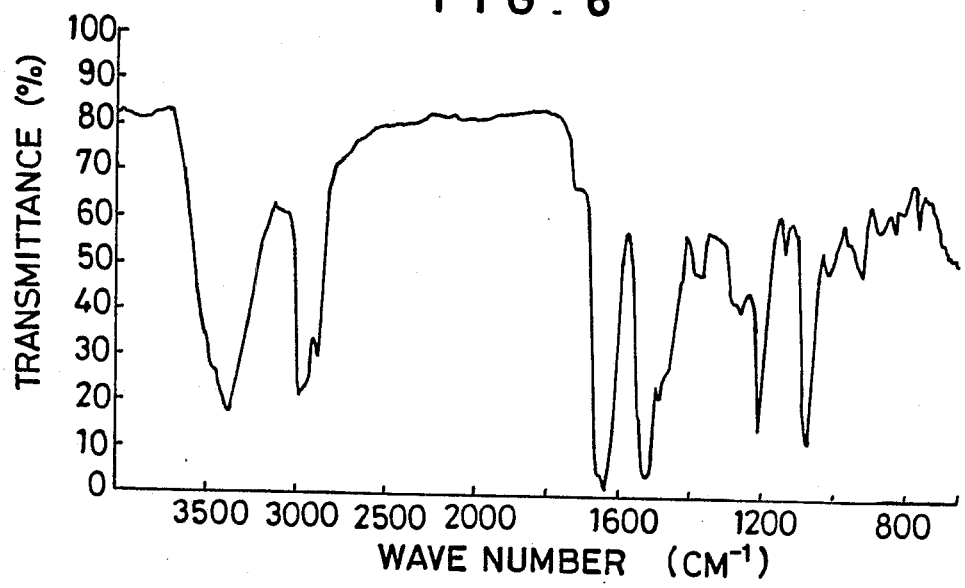
FIG. 6 is an IR spectrum of poly(N-tetrahydrofurfuryl methacrylamide) of the present invention.

From the spectrum of FIG. 6, the absorption of a vinyl group appearing at 1615 cm$^{-1}$ in the spectrum of FIG. 4 is absent. This indicates that the polymer giving the spectrum of FIG. 6 was a polymer of N-tetrahydrofurfuryl methacrylamide.

The transition point of each of the polymers was determined based on the change of transmittance of the aqueous solution of polymer due to change of temperature and on the DSC measurement. To be specific, the determination of the transition point was effected by preparing an aqueous solution containing the polymer in a concentration of 1% by weight, setting this aqueous solution in a spectrophotometer provided with a temperature controller, heating the aqueous solution at a temperature increasing ratio of 1° C./min and simultaneously continuing measurement of the transmittance of the aqueous solution at a wavelength of 500 nm, finding the temperature (T1) at which the transmittance falls to ½ of the initial transmittance, and taking this temperature (T1) as the transition point. Separately, the transition point of each of the polymers was determined by adding 7 mg of the polymers to 50 mg of water, heating the resultant aqueous solution at a temperature increasing rate of 1° C./min and simultaneously continuing measurement of DSC, finding the temperature (Td) at the peak of heat absorption, and taking this temperature (Td) as the transition point.

Figure 7:
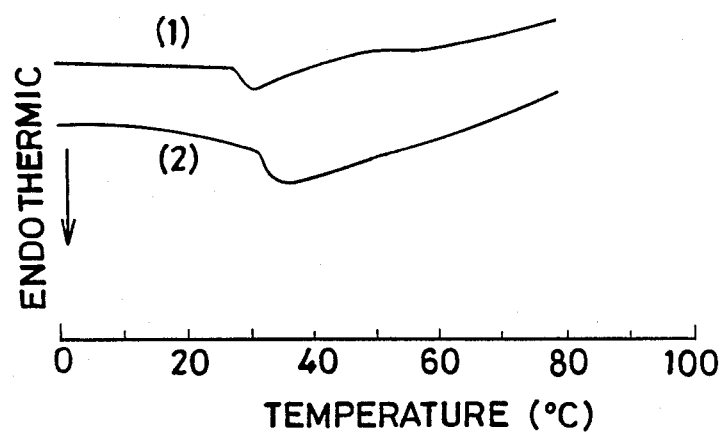
FIG. 7 is a graph showing the DSC curve of an aqueous solution of a hydrophilic-hydrophobic thermally reversible type polymer of this invention produced in the example described in this specification.

The results are shown in the following table. The DSC curve consequently obtained is shown in FIG. 7 and the transmittance-temperature curve in FIG. 8.

Figure 8:
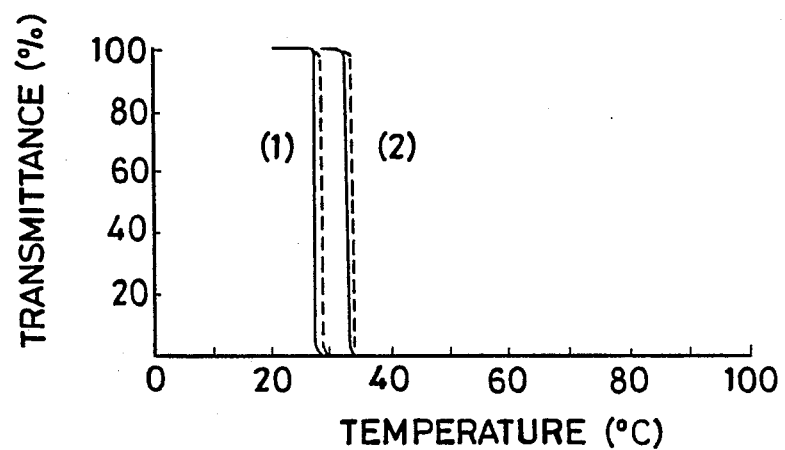
FIG. 8 is a graph showing the relation between the transmittance of the hydrophilic-hydrophobic thermally reversible type polymer of this invention produced in Example as measured in an aqueous 1% by weight solution and temperature.

In these diagrams, (1) represents the data for poly(N-tetrahydrofurfuryl acrylamide) and (2) the data for poly(N-tetrahydrofurfuryl methacrylamide). In FIG. 8, the solid line represents the data obtained during temperature increase and the dotted line the data obtained during temperature decrease.

| Type of experiment | Monomer | | Polymer | | | | Amount of heat transfer ($\Delta H$) cal/g |
|---|---|---|---|---|---|---|---|
| | Kind | Amount used (g) | Amount produced (g) | Intrinsic viscosity [$\eta$] | Transition point (°C.) | | |
| | | | | | T1 | Td | |
| Working example | N—tetrahydrofurfuryl acrylamide | 2.11 | 2.10 | 0.83 | 27.0 | 30.0 | 1.6 |
| | N—tetrahydrofurfuryl methacrylamide | 2.12 | 1.78 | 0.20 | 33.0 | 36.5 | 3.4 |

What is claimed is:

1. A hydrophilic-hydrophobic thermally reversible composition comprising:

a polymer consisting of repeating units represented by the formula:

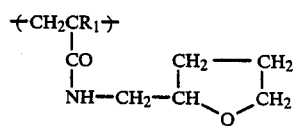

wherein R$_1$ represents one member selected from the group consisting of a hydrogen atom and a methyl group, and possessing an intrinsic viscosity $\eta$ in the range of 0.01 to 6.0 as measured in a methanol solution at 30° C., and water, said polymer being soluble in water at temperatures below a transition temperature wherein a transparent aqueous solution of the polymer is produced, said polymer being insoluble in water at temperature above said transition temperature wherein an opaque, aqueous composition of the polymer is produced.

2. The composition according to claim 1, wherein $R_1$ in the formula is a hydrogen atom.

3. The composition according to claim 1, wherein $R_1$ in the formula is a methyl group.

4. The composition according to claim 1, wherein 1% by weight of said polymer which possesses an intrinsic viscosity of 0.83 as measured in a methanol solution at 30° C. is contained in said composition and has a transition point in the range of 27° C. to 30° C.

5. The composition according to claim 1, wherein 1% by weight of said polymer which possesses an intrinsic viscosity of 0.20 as measured in a methanol solution at 30° C. is contained in said composition and has a transition point in the range of 33.0° C. to 36.5° C.

* * * * *